2,868,328

ACETYLENE SOLVENT

Raymond A. Franz, El Dorado, Ark., assignor to Monsanto Chemical Company, St. Louis, Mo., a corporation of Delaware No Drawing. Application May 23, 1957
Serial No. 661,044

2 Claims. (Cl. 183—115)

This invention relates to 1-(1'-pyrrolidylcarbonyl)-pyrrolidine as a new composition of matter and to its utility as an acetylene solvent.

1-(1'-pyrrolidylcarbonyl)-pyrrolidine can be readily prepared by reacting 1-pyrrolidylcarbonyl chloride and pyrrolidine in an organic diluent in the presence of an HCl acceptor. The following example illustrates the process of preparation:

Benzene (400 cc.) was saturated with 100 g. (1.0 mol) of $COCl_2$ (phosgene) and placed in a 2-liter, 3-neck flask equipped with a reflux condenser and stirrer. The $COCl_2$-saturated benzene was set at total reflux with $COCl_2$ bubbling through the solution from a $COCl_2$ tank. To the refluxing mixture was added, over a period of 1 hour, a solution of 71 g. (1.0 mol) of pyrrolidine dissolved in 100 cc. of benzene. The mixture was stirred and refluxed during the addition of pyrrolidine. After the addition, the mixture was then refluxed for 2 hours.

After refluxing for 2 hours the benzene was removed by atmospheric distillation. The brown residue was vacuum distilled and a large colorless cut of 1-pyrrolidyl-carbonyl chloride, distilling at a range of 94°–96° C. at 5 mm. Hg absolute, was recovered. A 50% yield (65 g.) of 1-pyrrolidylcarbonyl chloride was obtained having the following properties:

Density at 20° C _____ 1.2120
$N_D^{25°}$ _____ 1.4908

1-pyrrolidylcarbonyl chloride may be represented by the following formula:

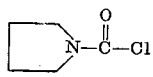

To a refluxing mixture of 1-pyrrolidylcarbonyl chloride (.31 mol) prepared as described above and triethylamine (.35 mol) dissolved in benzene, was added, with stirring (.30 mol), pyrrolidine in 100 cc. of benzene over a period of about 30 min. After addition, the mixture was stirred and refluxed for 2 hours.

After refluxing for 2 hours, an ethanolic solution of KOH (.35 mol) was added and the mixture was refluxed for an additional 2 hours.

After cooling the reaction product was washed 3 times with a 5% solution of NaOH, and the benzene and ethanol were removed by atmospheric distillation.

The light brown product remaining was vacuum distilled with a colorless cut of 1-(1'-pyrrolidylcarbonyl)-pyrrolidine, distilling at 115°–120° C. at 0.2 mm. of Hg absolute, being recovered. 1-(1'-pyrrolidylcarbonyl)-pyrrolidine thus obtained had the following properties:

$N_D^{25°}$ _____ 1.5090
Density at 20° C _____ 1.0854

Chemical analysis:

|  | C | H | N |
|---|---|---|---|
|  | Percent | Percent | Percent |
| Calculated for $C_9H_{16}N_2O$ | 64.28 | 9.60 | 16.66 |
| Observed | 64.28 | 9.40 | 16.51 |

1-(1'pyrrolidylcarbonyl)-pyrrolidine may be represented by the following formula:

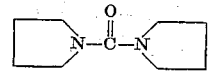

The procedure set forth in the preceding example for the preparation of 1-(1'-pyrrolidylcarbonyl)-pyrrolidine can be substantially varied without departing from the scope of the invention. The reaction is conveniently carried out in an inert organic diluent and preferably in an inert organic solvent. Aromatic and alphatic hydrocarbons, chlorinated hydrocarbons, ethers, and alcohols can be used for this purpose.

The quantities of reactants used can be varied considerably. Approximately equal molecular quantities of 1-pyrrolidylcarbonyl chloride, pyrrolidine and the HCl acceptor are particularly convenient although excesses of either of these materials can be used if desired. As high as a 100% or higher excess of any of the reactants, while effecting the yield of the desired product, does no prevent the formation of any of the desired product.

Any HCl acceptor compatible with the reaction system can be used if desired. Organic amines soluble in the reaction system are particularly useful. Of these, the alkyl amines are preferred.

The reaction can be carried out over a wide temperature range although best results are obtained at elevated temperatures. Temperatures in the range from about 20° C. to about 100° C. are particularly suitable. Preferably the reaction is carried out by boiling under reflux conditions.

After the reaction is complete 1-(1'-pyrrolidylcarbonyl)-pyrrolidine can be recovered from the reaction mixture by any convenient method. Recovery by distillation is particularly suitable.

The novel compound of this invention possesses outstanding utility as a selective solvent for aceylene. It can be used as a means for recovering acetylene from an acetylene containing gas stream and as a means of storing acetylene. Its exceptional solvency for acetylene was determined in accordance with the method outlined in Houben-Weyl, "Methoden Der Organische Chemie," Band III, Physikalische Forschungsmethoden, Teil I, p. 241. For comparative purposes the acetylene solvency of butyrolactone, a well-known acetylene solvent, was also determined in accordance with the procedure set forth above. At a temperature of 25° C. and a pressure ot 1 atmosphere, butyrolactone was found to dissolve 13.6 volumes of acetylene per volume of butyrolactone. Under the same conditions at a temperature of 25° C. and a pressure of 1 atmosphere, 1-(1'-pyrrolidylcarbonyl)-pyrrolidine was found to dissolve 18.6 volumes of acetylene per volume of 1-(1'-pyrrolidylcarbonyl)-pyrrolidine. The selectivity of 1-(1'-pyrrolidylcarbonyl)-pyrrolidine is further evidenced by the fact that under the same conditions butyrolactone dissolved 3.0 volumes of carbon dioxide per volume of butyrolactone while 1-(1'-pyrollidyl-carbonyl)-pyrrolidine dissolved only 2.1 volumes of carbon dioxide per volume of 1-(1'-pyrrolidylcarbonyl)-pyrrolidine.

According to this invention, 1-(1'-pyrrolidylcarbonyl)-pyrrolidine is most efficiently used in the extraction of acetylene from diluted acetylene such as is obtained by the partial oxidation of low molecular weight hydrocarbons. As an example, dilute acetylene obtained from the partial oxidation of methane with oxygen has the following composition:

|  | Percent |
|---|---|
| $C_2H_2$ | 8.5 |
| $H_2$ | 51.4 |
| N | 1.6 |
| CO | 26.3 |
| $CH_4$ | 5.8 |
| $CO_2$ | 5.9 |
| $C_2H_4$ | 0.1 |
| Heavier acetylenes | 0.4 |

This gas stream is treated under pressure with the aforementioned compound of this invention in any convenient manner well-known to those skilled in the art as, for example, by countercurrent absorption in a suitable column. The solution of acetylene is then transferred to a suitable desorption column where the pressure is released and the temperature raised. Concentrated acetylene is thus obtained and any contamination of the acetylene with the solvent is so small as to be insignificant.

In addition to the utility of 1-(1'-pyrrolidylcarbonyl)-pyrrolidine in the extraction of acetylene from diluted acetylene, the acetylene solvency in this compound clearly indicates that it is particularly suited for storing acetylene under elevated pressures. Solutions of acetylene in 1-(1'-pyrrolidylcarbonyl)-pyrrolidine can be stored in suitable metal containers and the acetylene released when desired by the application of heat and reduced pressure.

The solvent described herein may be used per se, or it may be used in mixtures with other acetylene solvents.

1-(1'-pyrrolidylcarbonyl)-pyrrolidine is disclosed and claimed in copending application Ser. No. 661,043, filed May 23, 1957.

What is claimed is:

1. A composition of matter comprising a solution of acetylene in 1-(1'-pyrrolidylcarbonyl)-pyrrolidine.

2. In a process for the recovery of acetylene from an acetylene containing gas, the step of contacting said gas with 1-(1'-pyrrolidylcarbonyl)-pyrrolidine.

References Cited in the file of this patent

UNITED STATES PATENTS

| 2,670,810 | Dorsey | Mar. 2, 1954 |
| 2,753,381 | Nelson | July 3, 1956 |